United States Patent
Wong

(10) Patent No.: US 7,172,721 B2
(45) Date of Patent: Feb. 6, 2007

(54) THERMOPLASTIC MOLDING PROCESS

(75) Inventor: Tit Shing Wong, Kowloon (HK)

(73) Assignee: J.T. Labs, Ltd., Hong Kong (HK)

( * ) Notice: Subject to any disclaimer, the term of this patent is extended or adjusted under 35 U.S.C. 154(b) by 216 days.

(21) Appl. No.: 10/618,985

(22) Filed: Jul. 14, 2003

(65) Prior Publication Data
US 2004/0051215 A1    Mar. 18, 2004

Related U.S. Application Data

(60) Provisional application No. 60/409,217, filed on Sep. 9, 2002.

(51) Int. Cl.
*B29C 49/06* (2006.01)
*B29C 49/62* (2006.01)

(52) U.S. Cl. ............... 264/526; 264/530; 264/537; 264/538; 264/313; 249/183

(58) Field of Classification Search ......... 264/537, 264/526, 523, 530, 313, 538; 249/183
See application file for complete search history.

(56) References Cited

U.S. PATENT DOCUMENTS

| | | | | |
|---|---|---|---|---|
| 2,702,411 A | * | 2/1955 | Winstead | 264/548 |
| 4,115,494 A | * | 9/1978 | Valyi | 264/513 |
| 4,143,453 A | * | 3/1979 | Taluba | 29/453 |
| 6,403,003 B1 | * | 6/2002 | Fekete et al. | 264/129 |
| 6,524,519 B1 | | 2/2003 | Ohba et al. | |
| 6,733,716 B2 | * | 5/2004 | Belcher | 264/529 |

FOREIGN PATENT DOCUMENTS

WO    WO 01/83064    11/2001

* cited by examiner

*Primary Examiner*—Stefan Staicovici
(74) *Attorney, Agent, or Firm*—R. Neil Sudol; Henry D. Coleman; William J. Sapone

(57) ABSTRACT

The invention provides a novel thermoplastic molding process useful in the manufacture of hollow, deformable thermoplastic articles such as hollow doll heads. In the process of the instant invention, a parison is formed at a first injection station and is transferred to a blow mold station. At the blow mold station, the parison is transformed into a hollow, deformable thermoplastic article through application of a vacuum and gas injection. Articles made by the process of the instant invention have a highly realistic appearance and texture.

40 Claims, 2 Drawing Sheets

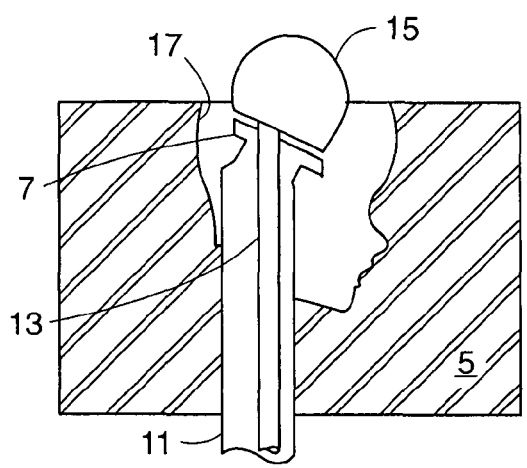
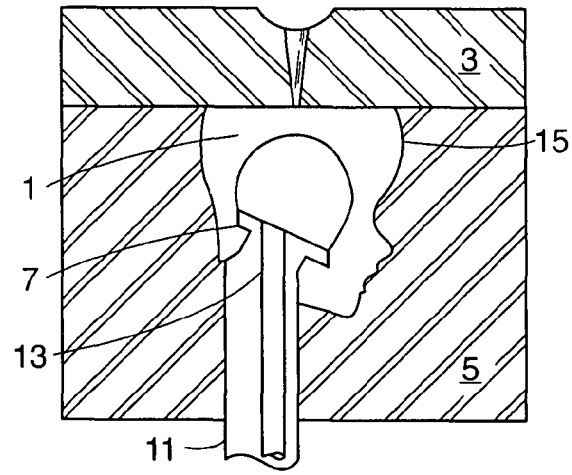
FIG. 1A  FIG. 1B
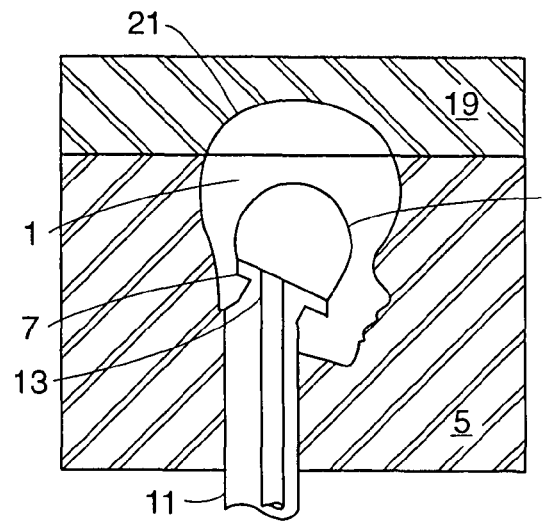
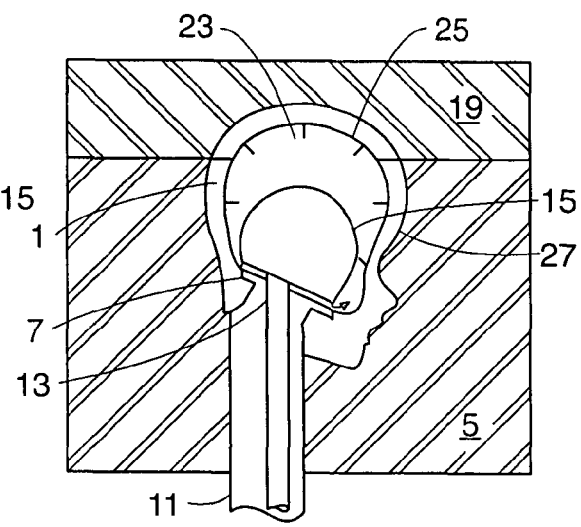
FIG. 2  FIG. 3

THERMOPLASTIC MOLDING PROCESS

RELATED APPLICATIONS

The instant application claims priority from U.S. Provisional Patent Application Ser. No. 60/409,217, filed Sep. 9, 2002.

FIELD OF THE INVENTION

The invention provides a novel thermoplastic molding process useful in the manufacture of hollow, deformable thermoplastic articles such as hollow doll heads. In the process of the instant invention, a parison is formed at a first injection station and is transferred to a blow mold station. At the blow mold station, the parison is transformed into a hollow, deformable thermoplastic article through application of a vacuum and gas injection. Articles made by the process of the instant invention have a highly realistic appearance and texture.

BACKGROUND OF THE INVENTION

Traditionally, soft, hollow toy parts such as doll heads were made by either by slush molding, dip molding, or rotocasting processes using latex or PVC, or by blow-molding processes using thermoplastic elastomers. These traditional processes, however, are not able to make hollow parts with controllable and precise wall thicknesses and opening dimensions. Nonetheless, due to the softness and easy processing of PVC, slush molding and rotocasting processes using PVC have been the primary process and the primary material for making one-piece hollow doll heads with direct hair rooting in the past half century.

In the last decade, questions regarding the environmental safety of PVC have lead some toy manufacturers to elect to discontinue PVC use in toys and dolls. Use of materials other than PVC has created the need for new processes for making soft hollow toy parts with controllable and precise wall thickness and opening dimensions.

In U.S. Pat. No. 6,403,003 ("'003 patent"), the complete disclosure of which is incorporated herein by reference, a method is provided for making a soft hollow part for a toy, such as a head for a doll. The method includes providing an injection moldable flexible thermoplastic elastomer, and providing a mold for the head part. The mold includes exterior mold parts and an interior core part, wherein the exterior mold parts are spaced apart from the interior core to define a cavity in the shape of the hollow part to be formed. The thermoplastic elastomer is injected into the mold cavity to form the hollow head. The head has an opening for removing the interior core, but the dimension of the core is larger than the dimension of the opening through which the core must be removed. After the head is injection molded, the exterior mold parts are opened to release the head and interior core, and then the interior core is removed from the head by extracting it through the opening in the head.

Preferably, the method disclosed and claimed in the '003 patent uses a non-PVC thermoplastic elastomer. In particular, a family of flexible thermoplastic elastomers known as S-B-S (Styrene-Butadiene-Styrene), S-I-S (Styrene-Isoprene-Styrene) and SEB-S (Styrene-Ethylene/Butylene-Styrene), marketed by Shell Chemical Company under the name KRATON, is preferred because of its resilience, strength and durability, as well as the ability to be painted and passing the general paint adhesion requirements for toys and dolls applications. An S-B-S copolymer, such as the copolymer marketed as KRATON D, is a particularly preferred elastomer. This copolymer is reported to be environmentally friendly and safe.

In a second aspect of the invention of the '003 patent, a mold is provided for making an injection molded hollow article, such as a doll head, using a thermoplastic elastomer. The mold includes an exterior mold portion and an interior core assembly. The exterior mold portion includes at least two separable sections for enclosing the interior core assembly. The interior core assembly fits inside the exterior mold portion. The interior core is spaced apart from the exterior mold portion to define a variable-thickness cavity having the shape of the hollow article to be molded and into which a melted thermoplastic elastomer may be injected to form the hollow article. The hollow article takes the shape of the cavity and includes an opening through which the interior core is removable. The interior core assembly has a cross-sectional dimension that is larger than the dimension of the opening in the hollow article from which it must be removed after the article is molded. Accordingly, this mold is useful for making a variety of hollow toy parts that have a narrow opening, such as heads, feet, or hands.

The '003 patent provides a method of making a doll head without an observable part line. When the head is injection molded, a part line is created at the junction of two exterior mold halves. The part line extends in a continuous line around the top of the head above the ears. Hair-material is rooted to the top of the doll head above and below the part line with a sufficient density such that the part line is not observable to an ordinary observer holding the doll at arms length.

Preferably, the invention of the '003 patent takes advantage of certain mold structures to make the soft hollow parts and dolls heads. A two-part solid core design with a mushroom-shaped ejector pin, double-ejection system may be used to locate the parting line at the top part of head within the hair rooting area, as shown in FIGS. 6–8 of the '003 patent, to make the part line not observable to the ordinary observer.

While the process of the '003 patent enables the manufacture of soft hollow toy parts and doll heads and provides for controllable and precise wall thickness at specific locations, the exact wall thickness formed is sometimes greater than desired. Because the thermoplastic elastomer is not forcibly dispersed against the top and bottom mold halves before it sets to form the doll head, the head forms with a thickness equivalent to the entire volume of the cavity. Due to tool structure limitations, the process of the '003 patent produces, in some cases, doll heads with sections that are thicker than otherwise desired. For example, the doll chin might be too thick. This in turn limits the deformability of the doll head, hence hindering its application in squeeze toys and dolls in which appendage deformation accentuates a realistic appearance. Additionally, formation of undesirably thick sections requires application of a higher holding pressure and a longer holding time to in order to cool and solidify the article without the development of shrinkage marks.

The need exists, therefore, for a thermoplastic molding process useful in the manufacture of hollow, deformable articles such as doll heads which have a relatively uniform and minimum thickness and which are free of manufacturing flaws such as shrinkage marks. Ideally, such a process would facilitate the removal of a manufactured article from a mold without damage to any features of the article.

OBJECTS OF THE INVENTION

It is an object of the instant invention to provide a thermoplastic molding process for the manufacture of hollow, deformable articles such as doll heads.

It is a further object of the instant invention to provide a thermoplastic molding process for the manufacture of hollow, deformable articles such as doll heads that have a relatively uniform and minimum thickness and that are free of manufacturing flaws such as shrinkage marks.

It is a still further object of the instant invention to provide a thermoplastic molding process for the manufacture of hollow, deformable articles such as doll heads which facilitates the removal of a manufactured article from the mold without damage to any features of the article.

SUMMARY OF THE INVENTION

In accordance with the above-stated objects, the instant invention provides an improved method of making hollow, deformable hollow thermoplastic articles. In the method of the instant invention, a thermoplastic elastomer is first injected at an injection station into a first mold comprising a two-part solid core design. The first mold comprises exterior mold parts, an interior core, and an injector pin. The exterior mold parts are spaced apart from the interior core to define a cavity in the shape of a substantial portion of the finished article. For example, the first mold may define that portion of a hollow doll head which extends below the hairline. Significantly, in a novel feature of the present invention, pressure is not maintained at the injection station until the injected elastomer (parison) is solidified. Instead, prior to parison solidification, the parison is transferred to a blow station comprising a second mold where, under vacuum and gas injection, the parison is relatively uniformly dispersed at a minimal thickness against the interior of the second mold cavity, and is thereafter cooled and solidified.

A vacuum is drawn through a valve pin inserted through the blow station mold cavity while pressurized gas is simultaneously injected into the parison through a movable core pin. This synergistic application of vacuum and gas injection disperses the parison material relatively evenly against the unfilled blow station mold cavity surface at a minimum thickness to form deformable, hollow thermoplastic articles, such as a hollow doll head. The temperatures and pressures maintained at the blow station ensure that the parison sets to form a deformable, hollow thermoplastic article that is substantially free of undesirable stress or burn marks.

Upon formation of the hollow, deformable thermoplastic article, the blow station mold front half is separated from the blow station mold rear half and the mold rear half is opened for ejection of the deformable hollow thermoplastic article. An ejector pin then moves forward and pushes the article out from the blow station mold cavity. In the case of a doll head, undercut features such as the nose, ears, mouth, and teeth are able to deform, collapse and release from the mold cavity without tearing or other damage. Further, the minimum head thickness facilitates compressed gas ejection of the head from the ejector pin.

A hollow, deformable thermoplastic article made by the process of the instant invention (i) has a thickness that is substantially less than the volume of the blow station mold cavity, and (ii) is more deformable than an article made by the process of the '003 patent. The method of the instant invention is therefore particularly useful in making squeeze toys for younger children and in making dolls in which appendage deformation accentuates a realistic appearance.

BRIEF DESCRIPTION OF THE DRAWINGS

FIG. 1A illustrates cross sectional views of the injection mold station comprising a mold with a two-part solid core design having front and rear halves with a mushroom-shaped ejector pin, and FIG. 1B illustrates cross sectional views of the parison injection at the injection mold station.

FIG. 2 illustrates a cross-sectional view of the transfer of the parison to the blow mold station.

FIG. 3 illustrates parison dispersion at the blow mold station.

DETAILED DESCRIPTION OF THE INVENTION

Figures 4, 5:
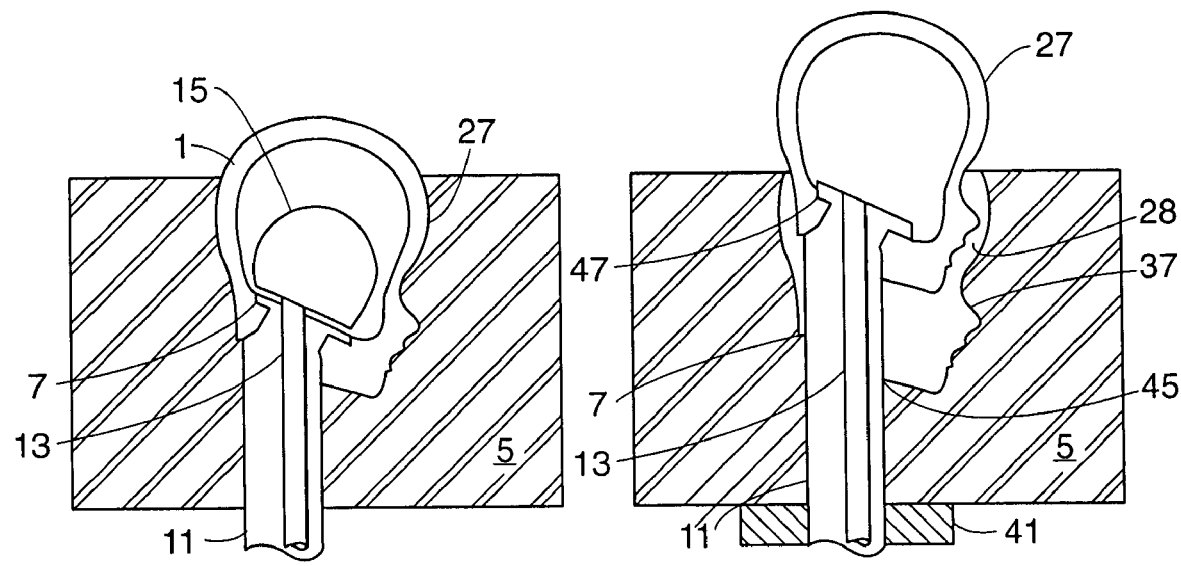
FIG. 4 illustrates a dispersed parison subsequent to removal of the blow station mold front half.
FIG. 5 illustrates mechanical ejection of a doll head from the blow station mold cavity through use of an ejector pin.

As used herein, the following terms have the following respective meanings.

The terms "front", "rear", "left", "right", "top", "bottom", "height", or "width" are provided from the viewpoint of the normal upright position of a deformable hollow thermoplastic article, e.g., a doll head, when taken from the perspective of the article and are used herein as an aid to identify and describe the different features of the preferred embodiments of the invention. Those directional terms are not meant, however, to limit the invention in any respect.

The term "injection moldable flexible thermoplastic elastomer" includes polyvinyl chloride (PVC), ethylene vinyl acetate copolymer (EVA), any of the polymers sold under the trademark KRATON by Shell Chemical Co. (such as optionally hydrogenated) styrene-ethylene/butylene-styrene (S-EB-S), styrene-butadiene-styrene (SB-S), styrene-isopropene-styrene (S-I-S), styrene-diene, styrene-isoprene and styrenebutadiene block copolymers, styrene-ethylene-butylene block copolymer containing mineral oil, branched styrene copolymer, styrene-butadiene rubber, styrene-butadiene triblock rubber, styrene-isoprene-styrene linear block polymer, styrene-butadiene radial block copolymer, butadiene-styrene copolymer rubber, or synthetic rubber) and low density polyethylene (LDP). Another potentially suitable thermoplastic elastomer is sold by Monsanto under the name SANTOPRENE. Preferably, an S-B-S, S-I-S or S-EB-S copolymer is used. A S-B-S copolymer is preferred.

Preferably, the thermoplastic elastomer is sufficiently flexible to stretch and allow the larger interior core pieces to be extracted from the interior of the hollow molded parts. A thermoplastic elastomer useful in molding realistic, deformable, hollow thermoplastic articles such as soft hollow toy parts is preferred. The elastomer should not pose any difficulty in molding detail, removal of the molded parts from the mold, or removal of larger cores through smaller openings.

In particular, a thermoplastic elastomer marketed by Shell Chemical Company under the name KRATON D is preferred because of its resilience, strength and durability, and its ability to form a strong and reliable solvent bond (e.g., using Toluene as the solvent). KRATON D is an S-B-S block copolymer, and is reportedly suitable for food and drug use applications, making it a good choice for use in toy parts where there is concern about the harmful effects of the toy material on children. KRATON D has a normal processing temperature range of 150° C. to 200° C., and a typical injection pressure of between 500 psi and 1000 psi, as noted in the Shell Chemical Technical Bulletin, SC:455-96. The injection molding methods of this invention work within the normal established processing parameters for KRATON D, and require no special processing requirements. It is also expected that other materials would not require special processing parameters to be used.

In regard to the flexibility and stretchability of the material used to make the hollow toy parts, KRATON has an elasticity, or elongation, that ranges up to between about two hundred fifty and five hundred fifty percent, depending on the grade selected. If a grade of elastomer is used in this invention with a higher elongation, then a larger interior core piece may be removed through a smaller opening in the toy part. The amount of force required to extract the undercut core will depend on the wall thickness of the toy part around the opening, and how much that opening needs to be stretched. The opening should not be stretched too far to prevent tearing or damage to the toy part.

The invention is described hereinafter with respect to the preferred embodiment of a doll head. However, such description is not meant to limit the term "hollow deformable thermoplastic article". "Hollow deformable thermoplastic article" includes elastomeric parts that may be made by injection molding and that are adaptable to mold-parison injection and dispersion steps such as those of the instant invention. The term can include mannequin appendages, elastomeric items used in diving or safety gear, and toy parts, including but not limited to parts of figurines resembling human characters. Further, as used herein, the term "doll head" could be the head of any toy, figurine, souvenir, animatronic robot, and the like, that represents a human figure, an animal, living or extinct, or even a fictitious character of unknown origin, such as an alien from another planet.

FIG. 1A and FIG. 1B illustrate a parison injection station used in the method of the instant invention comprising a double-ejector system for removal of a doll head from a mold. Referring to FIG. 1B, parison 1 defining a portion of a doll head is shown inside exterior mold halves defining an injection station first mold comprising a top mold half 3 and a bottom mold half 5. As illustrated in FIG. 1B, parison 1 defines that portion of a complete doll head below a latitudinal plane intersecting the head at a position above the eyes and below the crown of the head. As illustrated in FIGS. 1A and 1B. inside the first mold halves, there is an interior core assembly 7 through which extends ejector pin 13. Ejector pin 13 has a concentric hollow tube (not shown), which extends throughout its length for transmission of a compressed gas. The ejector pin 13 ends with a mushroom-shaped cap 15 in sleeve 11 of interior core assembly 7. As illustrated in FIG. 1A, first mold cavity 17 between first mold exterior mold halves 3 and 5 and the core assembly 7 is in the shape of the aforementioned parison 1. In the method of the instant invention, thermoplastic elastomer is first injected inside first mold cavity 17 to form parison 1. Mold half 5 has an interior cavity-forming mold surface provided with details for forming facial features of the doll head 27 including the whole face from forehead to neck. The facial features are formed during the injection molding process and maintained unchanged during the subsequent blow molding process. Accordingly, the completely molded doll head has facial features determined by injection molding and a crown determined by blow molding.

In the process of the instant invention, the injection molding processing conditions are influenced by the type and grade of thermoplastic elastomer selected. For example, in a typical injection molding process, the bulk of the materials of the composition are thoroughly mixed to provide a uniform feedstock. The feedstock is next processed for injection into an injection mold. In another vessel, pigment, polystyrene and a small portion of the thermoplastic elastomer (such as S-B-S copolymer) are mixed to homogeneity.

The prepared feedstock and the pigment-bearing mixture are injected at the injection station into the first mold, generally over a period of from about 0.2 to about 6 seconds, typically from about 0.5 to about 4 seconds, and preferably from about 1 to 3 seconds. This period enables the thermoplastic elastomer to fill first mold cavity 17 properly without over-stressing and allows the compressed gas to vent properly, thereby avoiding parison burning. The injection station pressure is determined by the particular thermoplastic elastomers employed and generally varies from about 200 psi to about 1000 psi, typically from about 300 psi to about 800 psi, and preferably from about 400 psi to about 700 psi. The injection station temperature is generally from about 150° C. to about 300°, typically from about 160° C. to about 220° C. and preferably from about 175° C. to about 200° C.

Optionally, any gas present in the first mold prior to the beginning of the elastomer injection cycle may be removed from the first mold by means of a vacuum assist coordinated with the injection of the elastomer composition. A vacuum can be drawn for a few seconds prior to the end of the elastomer injection period. It is to be noted that applying the vacuum assist too early in the injection period may result in overly large cell spaces within the first mold, yielding an overly spongy parison. However, failure to use a vacuum assist may result in increased cycle times. Optimization of the vacuum assist step will be influenced by parameters including elastomer composition and temperature.

Next, parison 1 is transferred to a blow station comprising a second mold illustrated in FIG. 2. Second mold front half 19 is substituted for parison injection station mold front half 3 illustrated in FIG. 1B. As illustrated in FIG. 2, cavity 21 of second mold front half 19 defines the remaining portion of the doll head not otherwise defined by first mold cavity 17 illustrated in FIG. 1A.

Referring to FIG. 3, high pressure compressed gas is next injected through the tube in ejector pin 13 and a vacuum is drawn in cavity 23 through suction pressure applied through pin 25. As a result of this gas injection and application of vacuum, parison 1 is dispersed relatively uniformly against the surfaces of second mold halves 5 and 19 defining cavity 23 to form a hollow, deformable doll head 27.

The second mold cavity vacuum pressure ranges from about −7 psig (gauge pressure) to about −14.5 psig, typically from about −9 psig to about −14.3 psig, and preferably from about −11 psig to about −14.0 psig. The pressure of the compressed gas injected into the second mold ranges from about 80 psig to about 1000 psig, typically from about 120 psig to 600 psig and preferably from about 180 psig to about 400 psig. No special venting of this gas is required. The compressed gas temperature preferably ranges from about 30° C. to 40° C. to help to cool the blown parison without subjecting it to undue stress caused by temperature shock. The blown and expanded parison 1 is generally maintained and sets within the second mold from about 5 seconds to about 90 seconds, typically from about 10 seconds to about 80 seconds, and preferably from about 15 seconds to about 30 seconds. It is preferred that molding at the blow station occurs as quickly as possible.

After a time period sufficient for parison 1 to harden effectively within the blow mold station, the second mold is opened and deformable doll head 27 is removed as follows. Referring to FIG. 4, subsequent to the dispersion of parison 1, second mold front half 19 (illustrated in FIG. 3) is removed. Next, as illustrated in FIG. 5, doll head 27 is partially ejected mechanically from bottom mold half 5 through upward movement of ejector pin 13. Some force may be required to squeeze the head out from the mold half because nose 28 must be flattened to squeeze out of the undercut portion 37 of the mold that defined the shape of the nose. Sleeve 11 is retained in a fixed position relative to ejector pin 13. This may be accomplished by a flanged limit stop 41 on the bottom of the core sleeve 11. Ejector pin 13 is pushed upward forcing the head to slide off of core sleeve 11 by stretching opening 45 in the bottom of the head around the widest part (i.e., major hollow dimension) 47 of core assembly 7.

Figure 6:
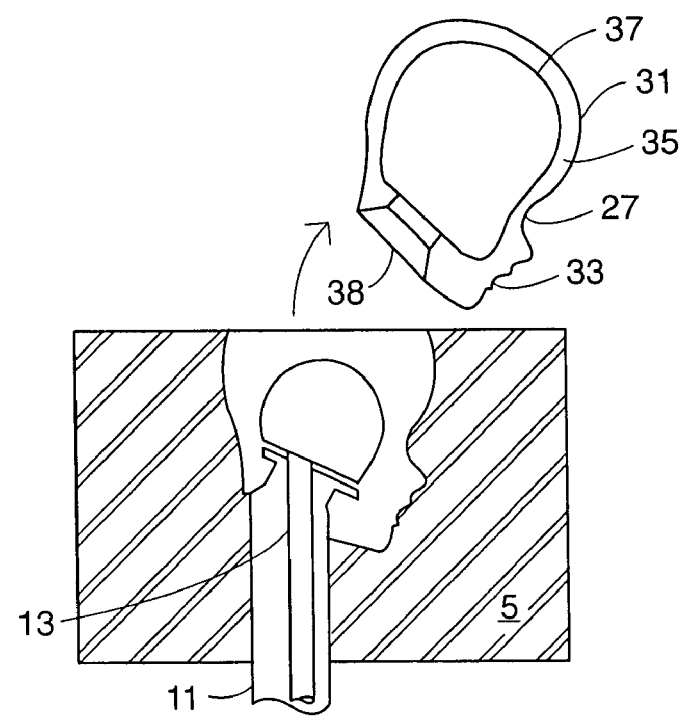
FIG. 6 illustrates compressed gas ejection of a doll head from the blow mold station.

As illustrated in FIG. 6, doll head 27 is ejected from ejector pin 13 through injection of compressed gas through a tube in ejector pin 13. Doll head 27 is ejected readily from ejector pin 13 since it has a smaller major dimension than part 47 of core assembly 7. Doll head 27 has a top 31 formed in blow mold station mold front half 19 (illustrated in FIG. 2) and a bottom 33 that is formed in bottom mold half 5. At the junction where the top and bottom exterior mold halves meet, a part line 35 is created that is substantially a continuous circle around the top 31 of doll head 27 and above the usual location for the ears. Doll head 27 has a hollow interior 37 surrounding the core, and an opening 39 through which core sleeve 11 and ejector pin 13 pass and contact the bottom mold half 5. It is particularly advantageous for doll head 27 to have a part line 35 around the top of the head, as it is normal for doll head 27 to have hair-material rooted on both the top of the head and below the part line. The hair-material, which is made of any natural or synthetic material suitable to resemble hair, should have a sufficient strand density to cover part line 35 and to obscure part line 35 from observation by an ordinary observer holding doll head 27 at arms length. "Ordinary observer" means a person viewing a doll for purposes of casual observation or play, and not for detailed inspection. Doll head 27 may be painted with a suitable paint compatible with the thermoplastic elastomer used.

Process parameters employed in the instant invention will vary depending upon the elastomer used and the article to be manufactured. Of course, it should be understood that changes and modifications can be made to the preferred embodiments described above and that the foregoing detailed description is illustrative rather than limiting.

What is claimed is:

1. A process for making a deformable, hollow thermoplastic doll head, comprising:
   (a) providing an injection moldable flexible thermoplastic elastomer;
   (b) providing a first mold, the mold comprising exterior mold front and rear sections and an interior core which extends vertically through the first mold, the first mold comprising a parison injection station, wherein the exterior sections of the first mold are spaced apart from the interior core to define a first mold cavity in the shape of a a complete doll head below a latitudinal plane intersecting the head at a position above the eyes and below the crown of the head;
   (c) assembling the exterior mold sections of the first mold thereby forming a planar junction between the exterior mold parts;
   (d) during an injection molding process, injecting the elastomer into the first mold cavity to form a parison;
   (e) opening the exterior mold parts of the first mold and transferring the rear section of the first mold and the parison to a blow station;
   (f) providing a second mold at the blow station, the second mold comprising an exterior mold front section, the rear section of the first mold, and an interior core, wherein the exterior mold front section of the second mold and the rear section of the first mold exterior sections are oriented latitudinally relative to one another and wherein the exterior sections of the second mold are spaced apart from the interior core of the second mold to define a cavity in the shape of the entirety of the hollow doll head;
   (g) during a blow molding process drawing a vacuum on, and injecting compressed gas into, the second mold, thereby dispersing the parison relatively evenly, and with a substantially uniform thickness, against the second mold cavity interior surface to form the hollow doll head, the hollow doll head having an opening for removing the interior core;
   (h) cooling the dispersed parison, thereby causing it to set and form the hollow doll head having facial features determined by injection molding and a crown determined by blow molding; and
   (i) separating the second mold interior core from the hollow doll head, wherein (I) the second mold cavity vacuum pressure ranges from about −7 psig to about −14.5 psig, the pressure of the compressed gas injected into the second mold ranges from about 80 psig to about 1,000 psig, the parison injection station temperature is from about 150° C. to less than about 300° C., the temperature of the compressed gas injected into the second mold ranges from about 30° C. to about 40° C., a vacuum is drawn upon the first mold cavity for about three to about ten seconds prior to the end of the elastomer injection period, the elastomer is injected into the first mold cavity over a period of from about 0.2 to about 6 seconds and the cooled and dispersed parison sets within the second mold in about 5 seconds to about 90 seconds; and
   (ii) the doll head has a hair line which forms a substantially continuous circle extending around the top of the doll head, and the first mold cavity is in the shape of a portion of the hollow doll head below the hair line, the rear section of the first mold defining facial features of the hollow doll head, the facial features of the doll head formed during the injection molding process remaining unchanged by the blow molding process.

2. The process of claim 1, wherein the elastomer is a material selected from the group consisting of optionally hydrogenated styrene-ethylene/butylene-styrene (S-EB-S), styrene-butadiene-styrene (S-B-S), styrene-isopropene-styrene (S-I-S), styrene-diene, styrene-isoprene and styrenee-butadiene block copolymers.

3. The process of claim 1, wherein the elastomer is a KRATON® block copolymer having an elasticity ranging between about two hundred fifty to five hundred fifty percent.

4. The process of claim 1, wherein (a) a vacuum is drawn on the second mold through a valve pin inserted through the second mold cavity, and (b) pressurized gas is injected into the second mold cavity through a movable core pin.

5. The process of claim 1, wherein a vacuum is drawn on, and compressed gas is injected into, the second mold at approximately the same time.

6. The process of claim 1, wherein:
a split line of the front and rear molds is a substantially continuous circle resulting in the formation of the hair line around the top of the doll head; and
the first mold interior core defines a cavity in the shape only of the portion of the hollow doll head below the split line of molds.

7. The process of claim 1, wherein the interior core of the second mold includes a core ejector pin and a core sleeve surrounding the pin, and upon separation of the second mold interior core from the deformable hollow thermoplastic doll head the core sleeve is retained in a fixed position relative to the ejector pin and the ejector pin is forced up against the deformable hollow thermoplastic doll head to push the deformable hollow thermoplastic doll head off of the core sleeve, thereby removing the deformable hollow thermoplastic doll head from the ejector pin.

8. The process of claim 1 wherein the interior core of the second mold includes a hollow conduit in communication with the interior of the deformable hollow thermoplastic doll head-forming cavity, and a pressurized gas is blown through the conduit and into the hollow interior of the deformable hollow thermoplastic doll head to separate it from the second mold interior core.

9. The process of claim 1 wherein the second mold is designed with a pre-determined ratio of the diameter of the core relative to the diameter of the opening to allow removal of the core through the opening, said pre-determined ratio being less than 4:1 for commonly market available thermoplastic elastomer for making doll heads.

10. The process of claim 9, wherein the thermoplastic elastomer is a S-B-S copolymer, and the pre-determined ratio is more than about two.

11. The process of claim 1, further comprising: (a) placing a removable object onto the surface of the interior core of the second mold; (b) assembling the exterior parts of the second mold around the core and removable object; and (c) overmolding the removable object with the thermoplastic elastomer when the parison is dispersed within the second mold cavity interior surface, such that the removable object is retained in the deformable hollow thermoplastic doll head when the interior core is removed.

12. The process of claim 11, wherein the thermoplastic elastomer overmolds only a portion of the removable object such that the removable object protrudes through the exterior surface of the deformable hollow thermoplastic doll head.

13. The process of claim 12, wherein the removable object is a doll eye.

14. The process of claim 1, further comprising placing at least one portion of an exterior part of the first mold in contact with the interior core to define at least one opening to be formed in the deformable hollow thermoplastic doll head.

15. The process of claim 14, further comprising placing an article into at least one of said openings formed by the contact between the exterior mold part and interior core after the deformable hollow thermoplastic doll head is removed from the second mold interior core.

16. The process of claim 6, further comprising removing the head from the second mold interior core, wherein the second mold interior core comprises at least two separable sections, and the hollow doll head is removed from the second mold interior core by separately and individually removing each separable core section from the head through the opening.

17. The process of claim 1, wherein at least one of the interior core separable sections of the second mold is a key section that must be removed first to allow other separable sections to be later removed.

18. The process of claim 17, wherein after the interior core separable sections of the second mold are removed from the deformable hollow thermoplastic doll head, the sections are reassembled and replaced in the exterior of the second mold for forming another deformable hollow thermoplastic doll head.

19. The process of claim 6, further comprising rooting hair-material to the top of the doll head above and below the part line with a sufficient density such that the part line is not observable to an ordinary observer holding the doll at arms length.

20. A process for making a deformable, hollow thermoplastic doll head, comprising:
(a) providing an injection moldable flexible thermoplastic elastomer;
(b) providing a primary mold including an exterior first mold section and an exterior second mold section and further including an interior core extending vertically through the primary mold, the exterior sections of the primary mold being spaced from the interior core at an injection station to define a first mold cavity in the shape of a a complete doll head below a latitudinal plane intersecting the head at a position above the eyes and below the crown of the head, the first mold section of the primary mold being formed with details of a face of the doll head;
(c) assembling the exterior mold sections of the primary mold so as to form a planar junction between the exterior mold sections;
(d) during an injection molding process, injecting the elastomer into the first mold cavity of the primary mold at the injection station to form a parison having facial features formed by the first mold section of the primary mold;
(e) opening the exterior mold sections of the primary mold and transferring the first mold section together with the parison to a blow station;
(f) providing a secondary mold at the blow station, the secondary mold comprising an exterior third mold section, the first mold section, and the interior core, wherein the third mold section and the first mold section are spaced apart from the interior core to define a second mold cavity in the shape of the entirety of the doll head;
(g) drawing a vacuum on, and injecting compressed gas into, the secondary mold, at the blow station, thereby dispersing the parison relatively evenly during a blow molding process, and with a substantially uniform thickness, against an interior surface of the second mold cavity to form a molded hollow doll head, the hollow doll head having an opening for removing the interior core;
(h) cooling the dispersed parison, thereby causing it to set in the form of the hollow doll head having facial features determined by injection molding and a crown determined by blow molding; and
(i) separating the interior core from the hollow doll head; and
(j) removing the hollow doll head from the first mold section, the facial features of the doll head having been formed against the first mold section during the injecting the elastomer into the first mold cavity, the facial features of the doll head remaining unchanged by the blow molding process.

21. The process of claim 20, wherein a major diameter ratio of the interior core to the opening in the hollow doll head is at least 3:1 and a major diameter ratio of the hollow doll head to the opening therein is at least 5:1.

22. The process of claim 20, wherein the vacuum pressure in the second mold cavity ranges from about −7 psig to about −14.5 psig, the pressure of the compressed gas injected into the secondary mold ranges from about 80 psig to about 1,000 psig, the parison injection station temperature is between about 150° C. and less than about 300° C., the temperature of the compressed gas injected into the secondary mold ranges from about 30° C. to about 40° C., a vacuum is drawn upon the first mold cavity for about three to about ten seconds prior to the end of the elastomer injection period, the elastomer is injected into the first mold cavity over a period of from about 0.2 to about 6 seconds and the cooled and dispersed parison sets within the secondary mold in about 5 seconds to about 90 seconds.

23. The process of claim 20, wherein the hollow doll head has a hair line which forms a substantially continuous circle extending around the top of the doll head, a planar junction or split line between the first mold section and the third mold section giving form to the hair line.

24. The process of claim 20, wherein the elastomer is a material selected from the group consisting of optionally hydrogenated styrene-ethylene/butylene-styrene (S-EB-S), styrene-butadiene-styrene (S-B-S), styrene-isopropene-styrene (S-I-S), styrene-diene, styrene-isoprene and styrenee-butadiene block copolymers.

25. The process of claim 20, wherein the elastomer is a KRATON® block copolymer having an elasticity ranging between about two hundred fifty to five hundred fifty percent.

26. The process of claim 20, wherein (a) a vacuum is drawn on the secondary mold through a valve pin inserted through the second mold cavity, and (b) pressurized gas is injected into the second mold cavity through a movable core pin.

27. The process of claim 20, wherein a vacuum is drawn on, and compressed gas is injected into, the secondary mold at approximately the same time.

28. The process of claim 20, wherein the interior core includes a core ejector pin and a core sleeve surrounding the pin, and upon separation of the interior core from the hollow doll head the core sleeve is retained in a fixed position relative to the ejector pin and the ejector pin is forced up against the hollow doll head to push the hollow doll head off of the core sleeve, thereby removing the hollow doll head from the ejector pin.

29. The process of claim 20 wherein the interior core includes a hollow conduit in communication with the interior of the second mold cavity, and a pressurized gas is blown through the conduit and into the hollow interior of the hollow doll head to separate the hollow doll head from the interior core.

30. The process of claim 20 wherein the second mold is designed with a pre-determined ratio of the diameter of the core relative to the diameter of the opening to allow removal of the core through the opening, said pre-determined ratio being less than 4:1 for commonly market available thermoplastic elastomer for making doll heads.

31. The process of claim 30, wherein the thermoplastic elastomer is a S-B-S copolymer, and the pre-determined ratio is more than about two.

32. The process of claim 20, further comprising: (a) placing a removable object onto the surface of the interior core; (b) assembling the exterior parts of the secondary mold around the interior core and the removable object; and (c) overmolding the removable object with the thermoplastic elastomer when the parison is dispersed within the interior surface of the second mold cavity, such that the removable object is retained in the hollow doll head when the interior core is removed.

33. The process of claim 32, wherein the thermoplastic elastomer overmolds only a portion of the removable object such that the removable object protrudes through the exterior surface of the hollow doll head.

34. The process of claim 33, wherein the removable object is a doll eye.

35. The process of claim 20, further comprising placing at least one portion of an exterior part of the primary mold in contact with the interior core to define at least one additional opening to be formed in the hollow doll head.

36. The process of claim 35, further comprising placing an article into said additional opening after the hollow doll head is removed from the interior core.

37. The process of claim 20, further comprising removing the head from the interior core, wherein the interior core comprises at least two separable sections, and the hollow doll head is removed from the interior core by separately and individually removing each separable core section from the head through the opening.

38. The process of claim 37, wherein at least one of the separable interior core sections of the second mold is a key section that must be removed first to allow other separable sections to be later removed.

39. The process of claim 38, wherein after the separable interior core sections of the second mold are removed from the hollow doll head, the sections are reassembled and replaced in the second mold cavity for forming another hollow doll head.

40. The process of claim 23, further comprising rooting hair-material to the top of the doll head above and below the hair line with a sufficient density such that the hair line is not observable to an ordinary observer holding the doll head at arm length.

* * * * *